March 2, 1943.    B. M. BIRD ET AL    2,312,829
METHOD AND APPARATUS FOR SEPARATING LIQUIDS FROM SOLIDS
Filed Jan. 3, 1940    3 Sheets-Sheet 1

INVENTORS
Byron M. Bird.
Frank P. Smith.
BY Corbett & Mahoney
ATTORNEYS

March 2, 1943.   B. M. BIRD ET AL   2,312,829
METHOD AND APPARATUS FOR SEPARATING LIQUIDS FROM SOLIDS
Filed Jan. 3, 1940   3 Sheets-Sheet 3

INVENTORS
Byron M. Bird.
Frank P. Smith.
BY Corbett & Mahoney
ATTORNEYS

Patented Mar. 2, 1943

2,312,829

UNITED STATES PATENT OFFICE 2,312,829

METHOD AND APPARATUS FOR SEPARATING LIQUIDS FROM SOLIDS

Byron M. Bird and Frank P. Smith, Columbus, Ohio, assignors to Battelle Memorial Institute, Columbus, Ohio, a corporation of Ohio Application January 3, 1940, Serial No. 312,256

15 Claims. (Cl. 210—73)

This invention relates to a method and apparatus for separating liquids from solids. It has to do, particularly, with the separation of liquids from coal, although it is not necessarily limited thereto.

In the prior art, the methods used to separate solid from liquids depend largely upon the size of solids. This size differentiation includes coarse sizes, such as those retained on a ¾ inch screen, intermediate sizes, such as those passing through a ¾ inch screen but retained on a 35 mesh screen, and fine sizes, such as those passing through a 35 mesh screen. In all three categories, it is generally economical to remove the bulk of the liquid by mechanical means, sometimes in several stages. Normally, the ultimate removal must be obtained by the use of heat.

The common practice in the mechanical removal of liquids from the coarse sizes is to use screens or de-watering elevators to remove the bulk of the liquid. In the case of intermediate sizes, screens, thickening devices, and continuous centrifuges are used to remove the bulk of the liquid. In the case of the fine sizes, which are commonly products of a mechanical treatment of coarser sizes, it is usually most economical to remove the bulk of the water by thickening and filtering.

The present day centrifugal driers have one or more of the following disadvantages: They use considerable power per pound of liquid removed. The percentage of liquid left with the solids after treatment is high. The initial costs of the machines are high. The breakage of a friable material such as coal is excessive. The maintenance costs are high particularly for the screens used to remove the liquid. In some instances, this cost is still further increased by the wear resulting from impact of the solids on the screens.

One object of this invention is to attain a low power consumption per pound of removed liquid. Another object is to provide a method and apparatus which will bring about a relatively complete separation of the solids from the liquid. A further object is to bring about a separation with less breakage of the solids. Still further objects are to provide a method and apparatus which will result in a reduced wear on the machine and one that will have simplicity of design. An additional object is to provide for positive control of the widrawal of the solids, which is recognized as a prime requisite of efficient dewatering.

The method of our invention may be practiced by use of various machines. However, we shall describe herein certain preferred types of machines which, at the moment, seem to be most suitable for use in the practicing of our method. Briefly, our method involves the principle of centrifugal separation and contemplates the feeding of the materials to be separated into the interior of a screen-like receptacle or basket which is constantly rotating at a relatively high speed so that the material is conveyed along the screen to a point of delivery, with the result that the liquid passes through the screen while the solids eventually escape over the outer edge of the basket under the control of air jets which may be regulated as to position and volume to effectually control the rate of discharge of solids.

By the term "air jets" used in this description and in the claims, we intend to cover jets of air, dry steam and other gases.

The preferred embodiments of our invention are shown in the accompanying drawings wherein similar characters of reference designate corresponding parts and wherein.

Figure 1:
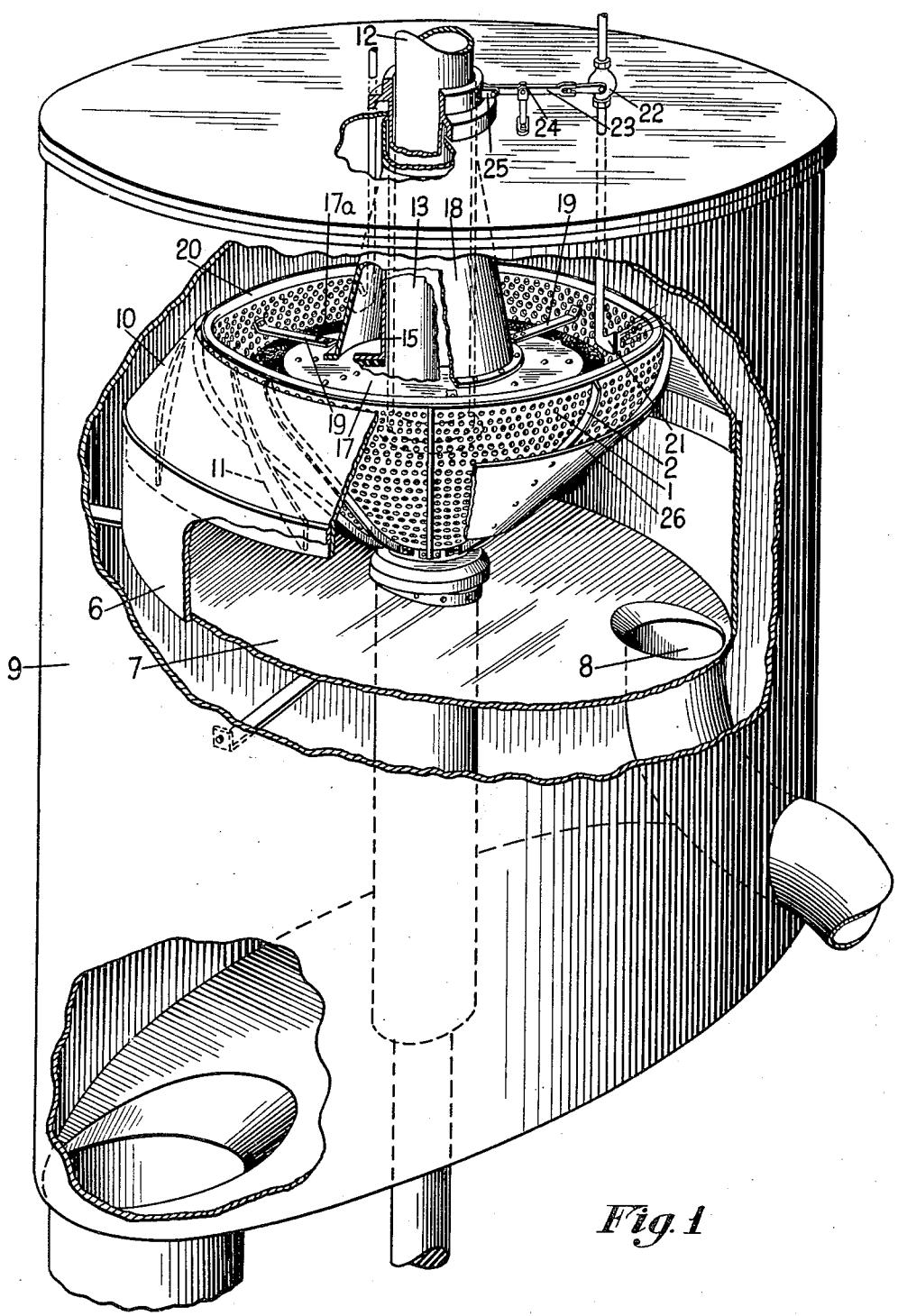
Figure 1 is a perspective view of a separating apparatus, with parts broken away to show some features of the interior thereof.

In the drawings, it will be seen that the apparatus therein embodies a basket 1 which is formed of a series of perforated plates. In one form of our invention these plates have a multiplicity or holes which are 0.079 inch in diameter and which account for about 40 per cent of the total area of the said perforated plates. These plates are attached to a reinforcing framework 2 which may be described generally as a basket frame. This basket frame is mounted upon a hub 3 on the upper end of the vertical shaft 4, which can be revolved by any suitable apparatus (not shown). The ball bearing 5 supports the vertical shaft at a point as near the basket hub 3 as is practicable, being enclosed in a housing.

Surrounding the basket and the basket frame is a stationary effluent receiver 6 which takes the form of a stationary cylindrical jacket that envelops the rotating basket and serves as a collector for the liquid discharged from the basket. This receiver 6 has a sloping bottom 7 which is provided with an outlet 8 at the lowest point thereof, for removal of liquid. This discharge outlet can be arranged to best suit the conditions of each installation. It can empty into a sump, a pump or some type of apparatus suitable for further treatment of the discharged liquid for the separation of any fine coal it contains.

Enclosing the effluent receiver 6 with its walls substantially spaced therefrom is a coal receiver 9 which, as indicated, is of larger diameter than the effluent receiver 6 and which is also stationary. The coal collected in this receiver may be discharged onto a conveyer belt, into a hopper or collected in any suitable manner to meet the requirements of each installation.

The top of the effluent receiver 6 is covered with a conical collar 10, which is attached to said receiver. The sloping upper face of this collar 10 will permit the coal discharged from the basket 1 to slide off into the coal receiver. This collar may be provided upon its under surface with vanes 11 so that the effluent as it comes through the rotating basket is caught and its swirling movement stopped gradually.

The material from which the liquid is to be separated is delivered through a stationary feed tube 12 which projects downwardly into the rotating basket and which is coaxial with the axis of rotation of the basket. Surrounding this feed tube is a sleeve 13 whose lower end is provided with a foot 14 which projects a substantial distance into the basket and which is vertically adjustable automatically as a result of piling up of the materials in the basket. The outer surface of the said foot is inclined or conical so that it will shed any material and prevent the accumulation of such material thereon. The purpose of this automatically adjustable sleeve will be subsequently described.

Surrounding the automatically adjustable sleeve 13 is another sleeve 15 which is mounted at its upper end upon a roller bearing 16 and which is provided at its lower end with a deflection plate 17. This deflection plate 17 is supported from the sleeve 15 by a cone-shaped member 18 and is connected with the rotating basket by metal strips 19 so that it will rotate therewith. This deflection plate 17 is in the form of a metal disk and carries a disk 17a of soft rubber or similar material on the under side thereof, which is of larger diameter than the metal disk so that the plate as a whole has a rigid center while retaining a flexible edge at its periphery.

Figure 2:
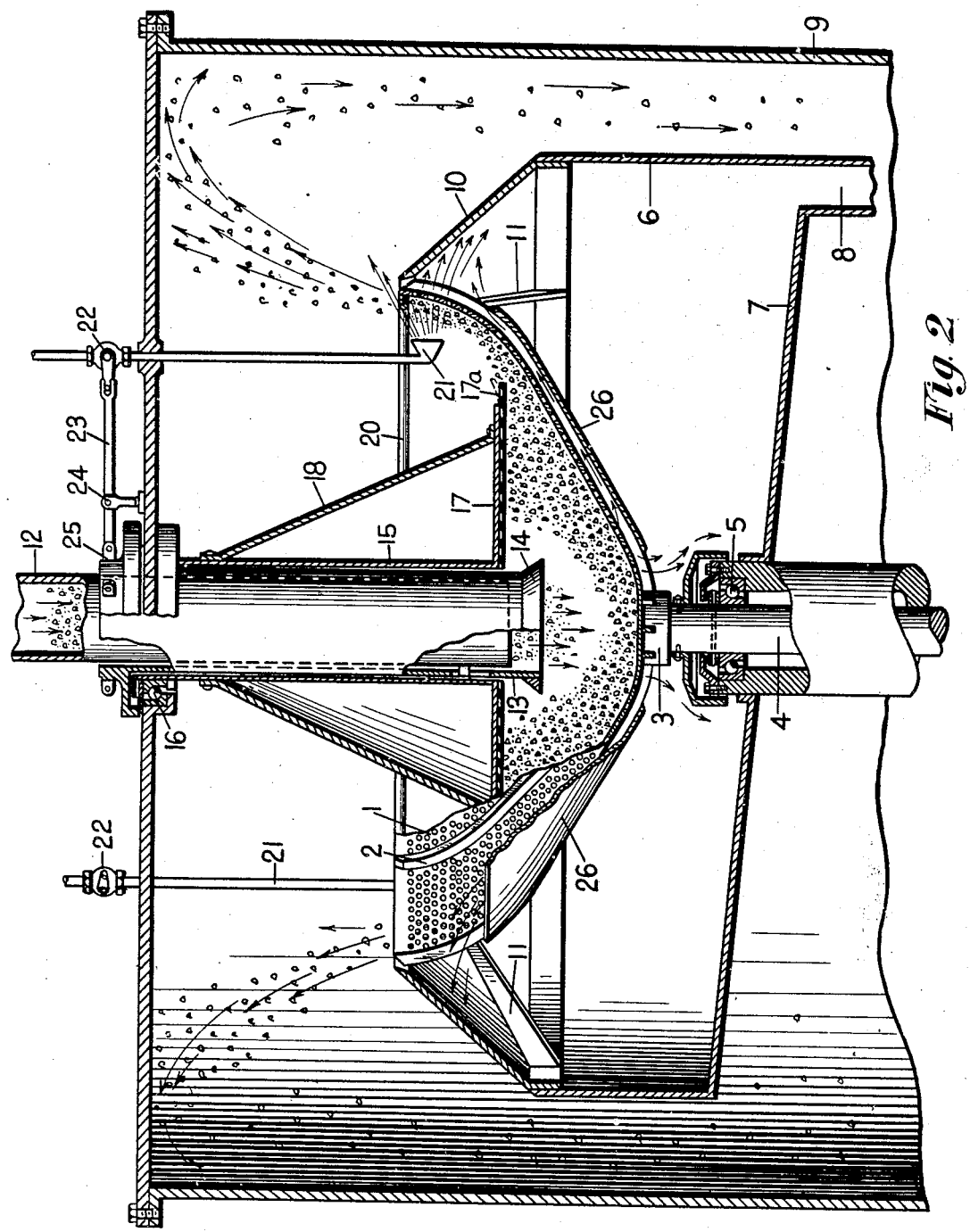
Figure 2 is a vertical sectional view of the apparatus shown in Figure 1.
Figure 3:
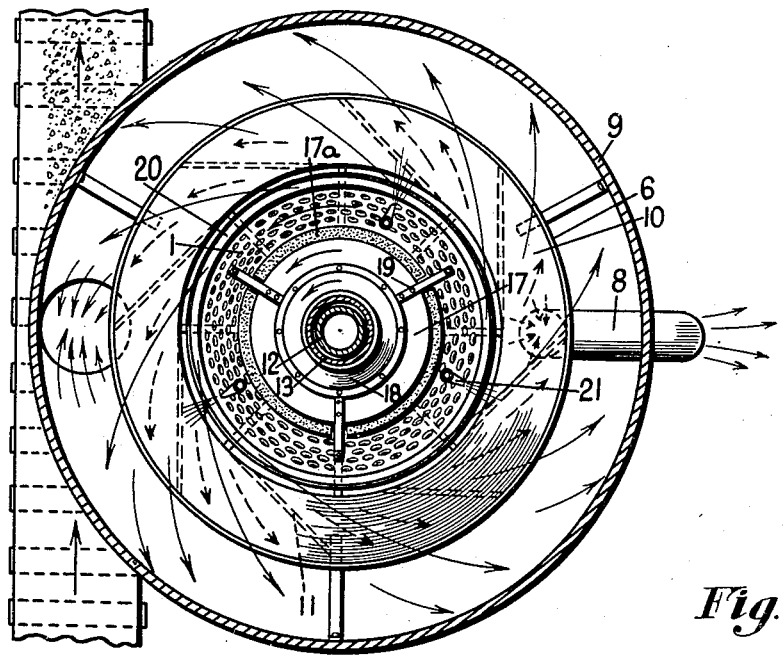
Figure 3 is a plan view of the screen-like basket illustrated in Figures 1 and 2.

The basket, at its upper end, carries a barrage ring 20, shown best in Figure 2, which extends inwardly from the inner surface of the basket to form a dam. Also located adjacent the upper end of the said basket, are air jets 21 which may be of any desired number. These air jets are mounted so as to direct the air at the basket just below the barrage ring. However, these air jets are adjustable vertically and rotatably so that the elevation and direction of jets may be varied as desired. In the form shown in Figures 1, 2 and 3, the delivery of air through these jets is controlled by a valve 22 which may be actuated automatically by a lever 23 which is fulcrumed at 24 and which is connected by a yoke 25 to the automatically adjustable sleeve 13. The result of this is that the automatic adjustment of this sleeve 13 as a result of varying levels of the material in the basket will in turn automatically operate the valve 22 so that as the quantity of material in the basket increases, more air is applied to the jets which serve to increase the amount of material being carried away thereby. It will be understood, however, that these jets may be manually controlled or that other automatic apparatus may be provided for controlling them.

The primary function of these jets is to regulate and control the amount of coal being delivered from the basket into the coal receiver. However, they are also effective to further dry the material being so delivered.

As previously stated, it is within the scope of our invention to utilize jets of dry steam and other gases instead of air jets.

The basket 1 with its supporting framework may be partially enclosed in a casing 26 as illustrated in Figure 2. This casing will have the effect of decreasing the air resistance to the rotation of the basket. The moisture which is thrown outwardly through the perforations of the basket will travel upwardly along the casing as indicated by the arrow and will be delivered over the top edge of such casing and into the effluent receiver. In addition to reducing air resistance, this casing has the further advantage that the water is discharged at a higher elevation and then impinges against the side walls of the effluent receiver 6. This tends to wash any fine solids therefrom.

Figure 4:
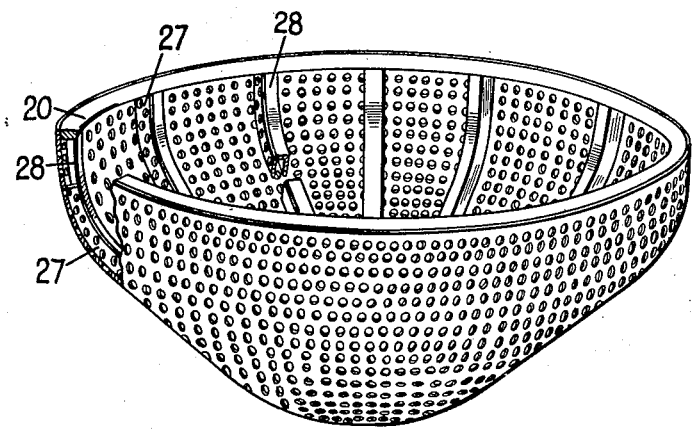
Figure 4 is a perspective view illustrating a modification of the screen shown in Figures 1, 2 and 3.

The basket 1 may also be provided on its interior with vanes 27 as shown in Figure 4 so that the material in the basket is maintained in separate pockets rather than in one mass. These vanes may be made of perforated plate and may be backed up with a channel 28 to lead the water extracted thereby out into the effluent receiver. In this case, the outside ribs for support of the basket would normally be unnecessary. It will be understood that the supporting ribs for the basket may be on the inside, and that this would result in low air resistance.

In the operation of the form of apparatus thus far described, the feed which is composed of solids and liquids to be separated is introduced through the feed tube 12 at the center of the basket and drops to the bottom thereof from which it is fed outwardly due to the centrifugal force resulting from the rotation of the basket. The solids and liquids move outwardly until they meet the side walls of the basket and then gradually travel outwardly and upwardly due to the shape of the basket. The movement is caused entirely by centrifugal force so that no mechanical means need be used. During this travel, the liquid is discharged through the perforations in the basket, this dischcarge being aided by centrifugal force. As the solids and liquids move farther and farther from the axis of rotation, the centrifugal force exerted on them increases. In order to slow up the movement of the solids so that sufficient time may be available for removal of the liquid, the steepness of the walls of the basket increases with the increase of radius. Near the axis, the slope is nearly horizontal but it gradually increases until a tangent to the curve is about 90 degrees from the horizontal at the rim.

The rate of discharge of the dewatered material is controlled by the air jets 21, which are so arranged and adjusted that the top layers of the bed are discharged at a faster rate than the lower layers. However, the bottom layers are slowly replaced with new solids. This action keeps the bed of solids in a pervious state so that liquid can filter through. Also, the slowly moving lower layers of solids tend to take a large part of the wear from the screen plate.

The use of air directed at the basket in addition to dislodging the solids tends to keep the perforations open. The amount of air used is not large, as it need only be sufficient to dislodge the solids so that they will start to roll. Once started, no additional force is required to discharge them.

The deflection plate keeps the material from "shorting out." If a particle starts to fly out of the machine, it meets the deflection plate and is directed towards the basket wall so that it is subjected to the centrifugal force there before it is discharged. The rubber edge of the deflection plate is normally in a horizontal plane but, when the basket becomes loaded, this edge rises to make a larger opening between the plate and the basket wall to permit a heavier bed to form. As the load in the basket slacks off, this rubber edge of the deflection plate returns to its normal position. The barrage ring prevents any discharge of coal, except what is dislodged by the air jets.

The fact that the deflection plate which is connected to the basket is provided with a sleeve extending upwardly therefrom and that the upper end of such sleeve is mounted in a roller bearing results in a basket structure which is supported by bearings from above and below. It will likewise be noted that the feed tube is stationary inside the revolving tube which carries the deflection plate. The feed tube is made stationary so that the material introduced through it will not be subjected to centrifugal force which would cause the material to be carried to the walls of the tube and forcibly cling thereto, as would be the case were the tube to revolve. However, the material will fall freely due to gravitational force alone acting upon it until it enters the basket proper.

It will be obvious that other modifications of the apparatus are possible. Thus the basket may even be inverted provided the contour of the basket and the resultant of the centrifugal and gravitational forces are such as to maintain a bed on the screen so as to protect it from wear.

It will be seen from the above that we have provided a novel method and apparatus for centrifugally effecting separation of fluid from materials laden therewith. The nature of the basket which we utilize and the control of the delivery of the dewatered material by means of the adjustable jets makes possible an effective regulation of the travel of the material over the screen, so that there may be ample time for the separation of the liquid from the solids. As previously pointed out, the majority of the wear is upon the coal itself rather than upon the screen. Tests of our method and apparatus indicate that a more complete separation of the solids from the liquid may be obtained at a lower power consumption per pound of removed liquid than with prior art devices. These tests further indicate that there will be reduced wear on the machine and particularly on the screen plates. The design is extremely simple. The method and apparatus produce a more positive control of withdrawal of solids and less breakage of the solids being treated than with prior art devices. Also, there is less power loss through air resistance.

Having thus described our invention, what we claim is:

1. The method of separating liquid from solid material which comprises centrifuging said material to effect the separation of the liquid from the solid material and using centrifugal force alone to cause the movement of the solid material towards the point of discharge, and utilizing air jets directed outwardly at the point of discharge only to control the discharge of the solid material.

2. The method of separating liquid from solid material of rough and irregular shape which comprises centrifuging said material, establishing a bed of a portion of said material while centrifuging and causing it to move continuously but relatively slowly towards the point of discharge by means of centrifugal force alone, causing the balance of said material to flow over said bed at a relatively faster rate by using centrifugal force only, controlling discharge of the solid material by means of air jets located directly adjacent the point of discharge and directed outwardly toward the point of discharge, and removing liquid from said material through said bed.

3. A method of separating liquid from solid material which comprises centrifugally inducing such material to flow along a basket-like screen until it reaches the outer edge of said basket, separating the liquid from the solid material during said flow, the flow of material along said screen being caused entirely by utilization of centrifugal force, and controlling the discharge of the solid material over said edge or top of said basket by means of air jets located directly adjacent said edge and directed outwardly towards said edge.

4. The method of separating liquid from solid material which comprises centrifugally inducing such material to flow along a basket-like screen until it approaches a discharge point at the open end of said basket, removing liquid through the perforations in said screen, the flow of the material being caused entirely by utilization of centrifugal force, and controlling the discharge of the solid material from the open end of said basket through the medium of air jets located directly adjacent said open end and directed outwardly towards the discharge point thereof.

5. The method of separating liquid from solid material which comprises centrifugally inducing such material to flow along a basket-like screen until it approaches a discharge point at the open end of said basket, said flow of material being caused by centrifugal force alone, removing liquid through perforations in said screen, and controlling the discharge of the solid material from the open end of said basket, such control being effected through the medium of air jets located directly adjacent the open end of said basket and directed outwardly towards the discharge point thereof, and varying the effect of said jets in accordance with the load of material in the basket.

6. The method of separating liquid from solid material which comprises centrifugally inducing such material to flow along a basket-like screen until it approaches a discharge point at the open end of said basket, removing liquid through perforations in said screen, the flow of material being caused by utilization of centrifugal force only, and controlling the discharge of the solid material from the open end of said basket by means of air jets which are located adjacent the open end of said basket and are directed outwardly towards the discharge point thereof and which are so adjusted that the layers of the bed of material which are remote from the screen are discharged at a faster rate than the layers which are adjacent the screen.

7. The method of separating liquid from solid material which comprises centrifugally inducing such material to flow along a basket-like screen until it approaches a discharge point at the open end of said basket, removing liquid through perforations in said screen, the flow of material being caused by utilization of centrifugal force only, controlling the discharge of the solid material from the open end of said basket by means of air jets which are located directly adjacent the open end of said basket and are directed outwardly towards the discharge point thereof and which are so adjusted that the top layers of the bed of material are discharged at a faster rate than the lower layers, and varying the effect of said jets by variations in the load of material in the basket.

8. Apparatus for separating liquid from solid material comprising a rotating basket-like screen which flares outwardly in an upward direction so that centrifugal force alone produces movement of said material in the basket towards a discharge point at the open end of the basket, and air jets located directly adjacent the open end of said basket and directed outwardly towards the discharge point thereof for controlling the discharge of material therefrom.

9. Apparatus for separating liquid from solid material comprising a rotating basket-like screen which flares outwardly in an upward direction so that centrifugal force alone produces movement of said material in the basket towards a discharge point at the open end of the basket, air jets located directly adjacent the open end of said basket and directed outwardly towards the discharge point thereof for controlling the discharge of material therefrom, and means operatively connected with said air jets and having a part positioned in the path of material moving up over the basket surface for controlling said jets in accordance with the variations in the load of material in said basket.

10. Apparatus for separating liquid from solid material comprising a rotating basket-like screen which flares outwardly in an upward direction so that centrifugal force alone produces movement of said material in the basket towards a discharge point at the open end of the basket, means for feeding material into said basket, air jets located directly adjacent the open end of said basket and directed outwardly towards the discharge point thereof for controlling the discharge of material therefrom, and means operatively connected with said air jets and having a part positioned within the basket in the path of the material moving up over the basket surface for automatically controlling said jets in accordance with variations in the load of material in said basket so that as the load increases the effect of said jets increase.

11. Apparatus for separating liquid from solid material comprising a rotating basket-like screen with its open end up and flaring outwardly in an upward direction so that centrifugal force produces movement of said material in the basket towards said open end and causes it to be discharged over the upper edge thereof, means for delivering material into the open end of said basket, and air jets located directly adjacent the open end of said basket and directed outwardly towards the upper edge thereof for controlling the discharge of material over said edge as it is fed to such edge by the centrifugal effect of said rotating basket.

12. Apparatus for separating liquid from solid material comprising a rotating basket-like screen which has its open end uppermost, said screen having a lower portion which is disposed at a comparatively flat angle relative to the horizontal and portions of successively increasing angularity relative to the horizontal towards the upper open end thereof and upwardly along which the material will be moved by centrifugal force until it discharges over the upper edge thereof, and air jets located directly adjacent the upper open end of said basket and directed outwardly towards the upper edge thereof for controlling the discharge of material over said edge.

13. Apparatus for separating liquid from solid material comprising a rotating basket-like screen which has its open end uppermost, means for feeding material into said basket to permit it to flow upwardly towards the open end thereof, said screen having a lower portion which is disposed at a comparatively flat angle relative to the horizontal and portions of successively increasing angularity relative to the horizontal towards the upper edge thereof, said upper edge having an inwardly projecting dam formed thereon, and air jets disposed directly adjacent said upper edge within the basket and directed outwardly towards said edge for controlling the discharge of material over said upper edge.

14. Apparatus according to claim 13 including a plate disposed within the upper portion of the basket and having its edge spaced from the wall of the basket for regulating the delivery of material therefrom.

15. Apparatus according to claim 13 including a vertically movable member disposed within the basket and which is moved vertically in accordance with variations in the load of material in the basket, air control valves for each of said air jets, and means for operatively connecting said vertically movable member to said valves so that movement of the member controls the air supplied by said jets.

BYRON M. BIRD.
FRANK P. SMITH.